(No Model.)
D. C. WILLETT.
EQUALIZING DEVICE FOR VEHICLE SPRINGS.
No. 497,396. Patented May 16, 1893.
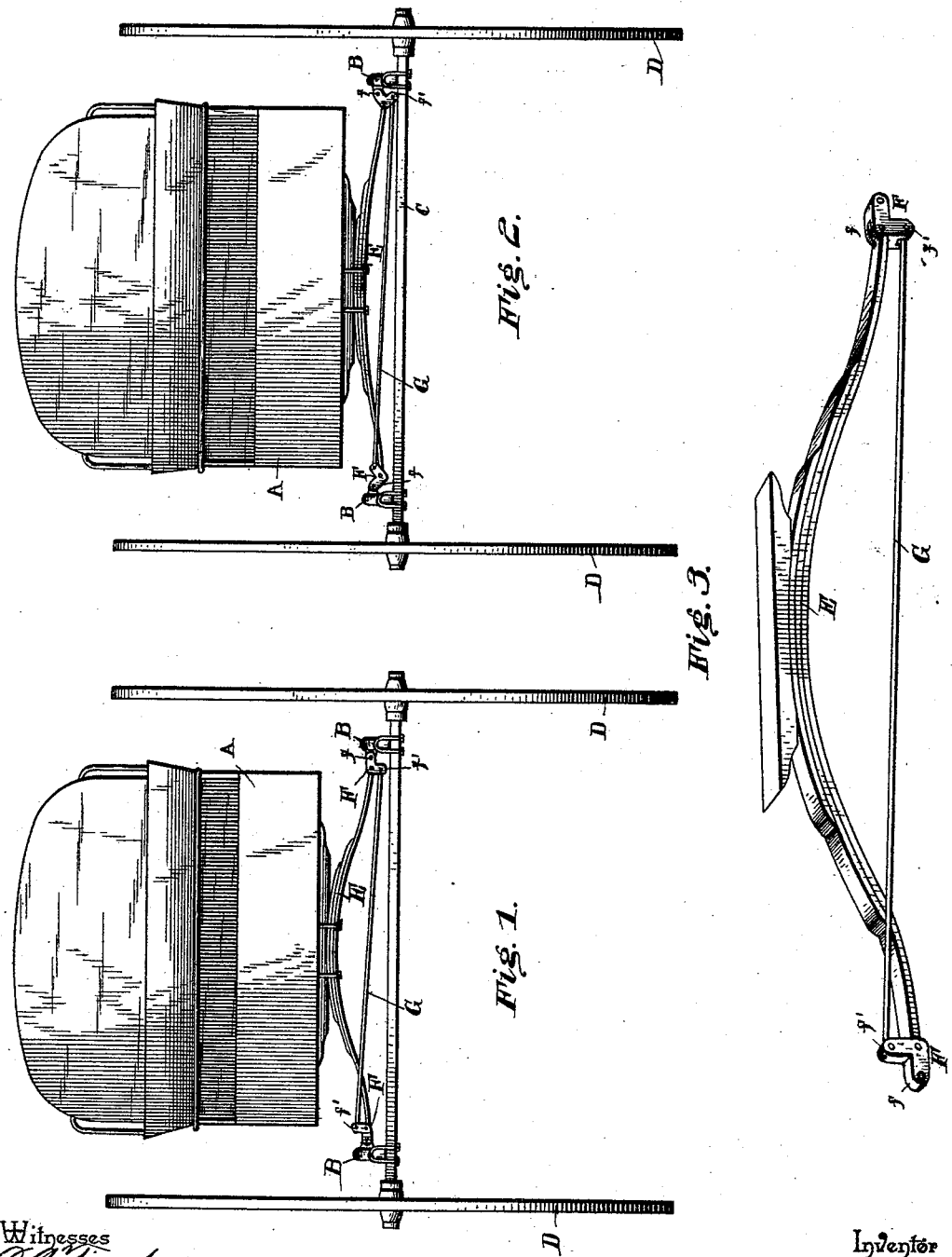
Witnesses
Inventor
Dallas C. Willett.
By his Attorneys,

UNITED STATES PATENT OFFICE.

DALLAS CLARK WILLETT, OF UNIONTOWN, KENTUCKY.

EQUALIZING DEVICE FOR VEHICLE-SPRINGS.

SPECIFICATION forming part of Letters Patent No. 497,396, dated May 16, 1893.

Application filed November 9, 1892. Serial No. 451,447. (No model.)

*To all whom it may concern:*

Be it known that I, DALLAS CLARK WILLETT, a citizen of the United States, residing at Uniontown, in the county of Union and State of Kentucky, have invented a new and useful Equalizing Vehicle-Spring, of which the following is a specification.

My invention relates to improvements in vehicle springs the object in view being to provide means whereby the load is distributed evenly and carried equally by both sides of the spring, thus causing the spring to be depressed evenly or regularly whether the load is applied to the center of the spring or to one side thereof. In the present practice, when the weight in the vehicle is not evenly distributed the latter is depressed a greater distance at one side than the other, this being especially noticeable in entering and dismounting from a carriage, but by a certain peculiar manner of hanging the spring and connecting the hangers, I am enabled to distribute the load so as to cause the vehicle to be depressed equally at both sides.

Further objects and advantages of my invention will appear in the following description, and the novel features thereof will be particularly pointed out in the appended claim.

In the drawings, Figure 1 is a rear view of a vehicle provided with my improved spring. Fig. 2 is a similar view showing the spring depressed. Fig. 3 is a detail view of the spring and connections.

A represents the body, B B the side-bars, C the axle, and D the wheels of an ordinary road-wagon, in connection with which I will illustrate my improved vehicle spring.

E represents an ordinary elliptical spring, to the center or upper side of which is attached the above-mentioned body, and F F represent angular or bell-crank hangers, to the elbows or angles of which are pivotally connected the terminals of the elliptical spring. These hangers, F, are oppositely-disposed, as shown, their outer or approximately horizontal arms, $ff$, being pivotally connected to the frame or running gear of the vehicle, or, as in the form of vehicle shown in the drawings, to the side-bars B B, and their vertical, oppositely-extending arms $f'f'$, being connected at their terminals by a distribution rod, G. When the spring and its connections are in their normal positions, as shown in Fig. 1 of the drawings, the outer arms of the hangers, F, are substantially horizontal, and the other arms of said hangers, being at right angles to the outer arms, are substantially vertical, the vertical arm of one hanger, however, extending upward and the vertical arm of the other, downward. The outer arms of the hangers are arranged in the same horizontal plane, as shown, thus bringing the pivotal points at the terminals of the elliptical spring in the same horizontal plane, and therefore when the parts are in their normal positions, (as shown in Fig. 1) the spring, proper, occupies the same position as heretofore.

The connections between the terminals of the spring and the frame of the vehicle consist of oppositely disposed angular or bell-crank hangers, to the elbows or angles of which the terminals of the spring are pivoted, the terminals of whose outer arms are pivoted to the frame of the vehicle and the terminals of whose oppositely-disposed vertical arms are connected by an inclined distributing-rod. With this construction the effect of a load imposed upon the spring is as follows: If the load is applied at the center of the elliptical spring the latter operates in the usual way, the tension of the distributing-rod being such as to prevent rattling or lateral play of the vehicle body. If the load is applied at one side of the body, so as to press more heavily upon one side of the spring than the other, that end of the spring which is under pressure is depressed, thereby depressing the elbow or angle of the connected hanger and swinging its vertical arm laterally, thus, through the medium of the distributing rod, swinging the vertical arm of the other hanger in the same direction, and depressing the elbow or angle of said other hanger and the connected end of the spring. The distance or amount of depression of the angle of the first-mentioned hanger will cause a certain lateral movement of its vertical arm, which lateral movement, being transmitted without loss to the other hanger, will cause a corresponding and equal movement of the latter, and hence, the two hangers being of the same size, will cause a depression of the angle of this second hanger equal to the depression of the first. Hence, both ends of the spring will be depressed equally irrespective of the place of application of the load.

Changes in the form, proportion and minor details of construction may be resorted to without departing from the principle or sacrificing any of the advantages of this invention.

Having thus described my invention, what I claim, and desire to secure by Letters Patent, is—

The combination with a vehicle frame, of angular or bell-crank levers having outer horizontal arms pivotally connected to said frame, and vertical oppositely-extending arms connected by a distributing rod, and a spring pivotally connected at its terminals to the angles of the levers whereby as the spring is depressed its ends are separated, substantially as set forth.

In testimony that I claim the foregoing as my own I have hereto affixed my signature in the presence of two witnesses.

DALLAS CLARK WILLETT.

Witnesses:
S. J. M. WILLETT,
LLOYD WILLETT.